United States Patent [19]

Gerteis

[11] 4,070,288

[45] Jan. 24, 1978

[54] DISC FILTER HAVING MEANS FOR SENSING THE THICKNESS OF FILTER CAKES AND METHOD OF FILTERING WITH THE FILTER

[75] Inventor: Paul Gerteis, Oetwil a, See, Switzerland

[73] Assignee: Chemap AG, Mannedorf, Switzerland

[21] Appl. No.: 675,189

[22] Filed: Apr. 8, 1976

[30] Foreign Application Priority Data

July 28, 1975 Switzerland .................. 9722/75

[51] Int. Cl.² .................. B01D 37/04; C02C 1/22
[52] U.S. Cl. .................. 210/65; 210/86; 210/97
[58] Field of Search .................. 210/66, 67, 79, 86, 210/96, 97, 104, 334, 327, 65, 85

[56] References Cited

U.S. PATENT DOCUMENTS

| 2,912,110 | 11/1959 | Stoltenberg | 210/86 |
| 3,050,858 | 8/1962 | Giesse | 210/86 |
| 3,077,988 | 2/1963 | Anderson et al. | 210/86 |
| 3,117,233 | 1/1964 | Mittelberger et al. | 210/86 |
| 3,204,766 | 9/1965 | Schmidt | 210/86 |
| 3,322,277 | 5/1967 | Pearson et al. | 210/86 |
| 3,428,176 | 2/1969 | Reneau | 210/86 |
| 3,640,395 | 2/1972 | Kinney | 210/334 |
| 3,712,471 | 1/1973 | Müller | 210/86 |

Primary Examiner—Frank W. Lutter
Assistant Examiner—Frank Sever
Attorney, Agent, or Firm—Michael J. Striker

[57] ABSTRACT

A disc filter includes a housing and a plurality of filter discs mounted in the housing at different levels of the latter. Means is provided for sensing the presence of a filter cake formed on one of the filter discs when the filter cake has a predetermined thickness. The sensing means includes a sensing member which is displaceable in response to the generation of a pressure differential thereacross. The sensing means further includes a switch which is connected with the sensing member and is operative in response to displacement of the sensing member. The sensing member, which is favorably in the form of a plate, is located intermediate a pair of the filter discs and is preferably arranged immediately below the lower surface of the upper filter disc of the pair. In operation, a medium to be filtered is admitted into the housing of the filter under pressure. As the medium is filtered by the filter discs, filter cakes build up on the filter discs. When the filter cake formed on the filter disc located immediately below the sensing member reaches the level of the sensing member, a pressure differential caused by the pressure of the medium being filtered is created across the sensing member. As a result, the sensing member is displaced and a signal is generated. The signal may be used to terminate the filtering operation so that the thicknesses of the filter cakes do not become excessive.

15 Claims, 1 Drawing Figure

U.S. Patent
Jan. 24, 1978
4,070,288
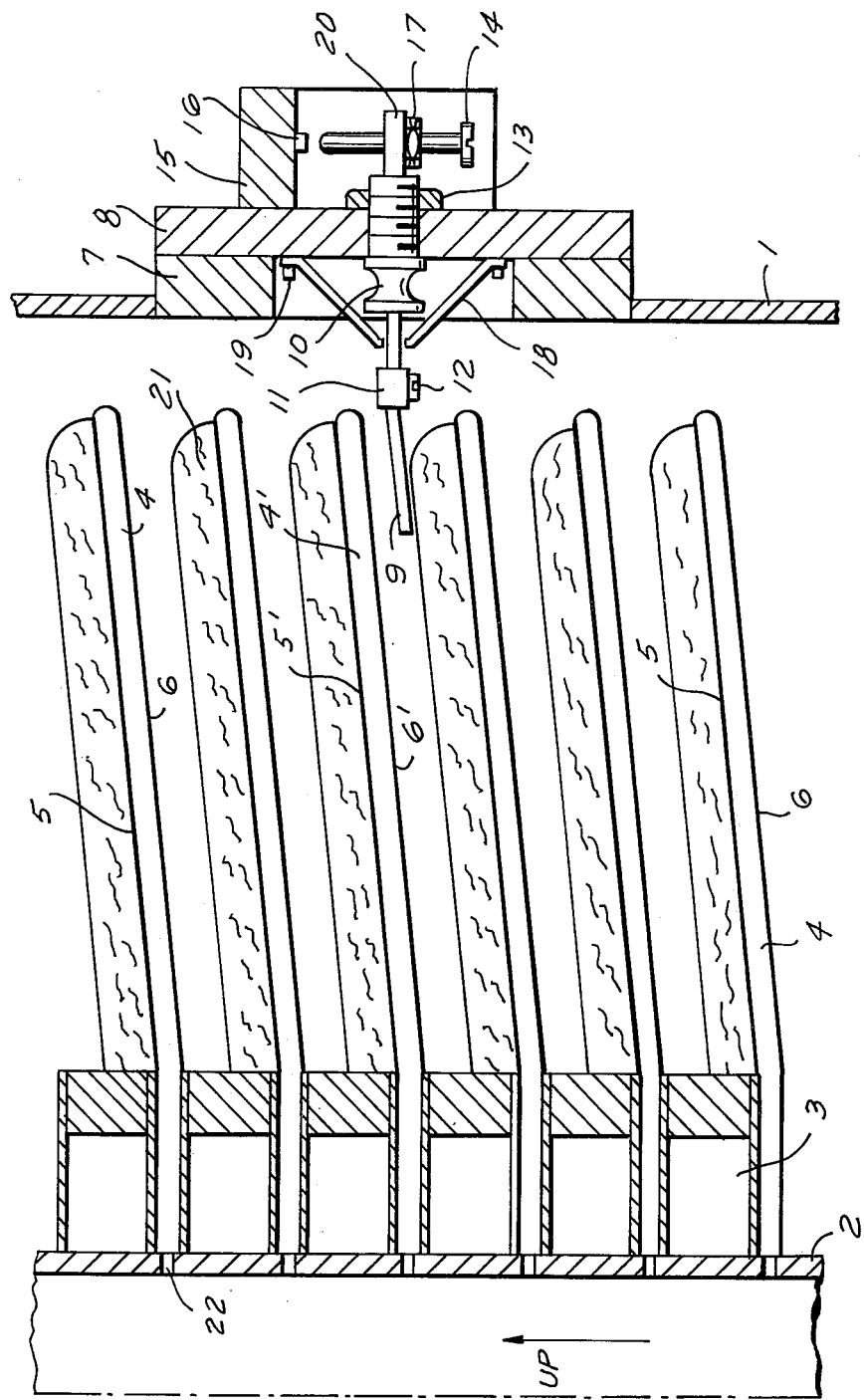

DISC FILTER HAVING MEANS FOR SENSING THE THICKNESS OF FILTER CAKES AND METHOD OF FILTERING WITH THE FILTER

BACKGROUND OF THE INVENTION

The invention relates generally to disc filters. Of particular interest to the invention are a method and arrangement for monitoring or sensing the thickness of a filter cake which builds up in a disc filter, especially a purifying filter of the centrifugal type.

A knowledge of the thickness of a filter cake is of significance in order that too great a build-up of the filter cake and an overloading of the filter discs, which may result in damage to the filter discs or to the entire filter, may be avoided. Although too great a thickness of the filter cake is undesirable for the reason mentioned, too small a thickness is also undesirable since the degree of utilization of the filter than becomes too low.

It is possible to calculate the quantity of solid material which accumulates on a filter cloth. However, when the proportion of solids in the fluid to be filtered varies, large inaccuracies may result and the risk of overloading is not eliminated.

Various methods for determining the filter cake thickness have also been proposed.

An apparatus for monitoring the thickness of a filter cake built on the upper surface of a horizontal filter element is described in the German Federal Republic Pat. No. 1,958,568. In this apparatus, a support arm is mounted on the wall of the filter. This support arm, which is accessible from exteriorly of the filter, may be moved over a filter element by means of a motor. In one embodiment of the apparatus, the support arm has a forked configuration and a light emitter and light detector are arranged at the tips of the times of the support arm.

Such an optical apparatus has the disadvantage that no measurement whatsoever can be obtained if the light transmissivity of the fluid being filtered is too low. Another disadvantage resides in that no contact may be had with alkaline solutions when the casing for the light is composed of glass. On the other hand, when the casing is composed of synthetic resin, the range of organic solvents which may be filtered is restricted. Moreover, apparatus of this type are susceptible to elevated temperatures. A further disadvantage arises because disassembly and removal of the optical apparatus are necessary when the filter is to be cleaned.

It is also known to use measurements of pressure differential as an indicator of the extent to which the filter discs are loaded with filter cake. This system functions satisfactorily when difficult-to-filter media are involved since a large pressure differential is already created with a small filter cake thickness. However, when the media involved are of the type which may be readily filtered, the pressure differentials created are small. Thus, even though overloading has occurred, the difference in pressure may still be very small.

Another apparatus is described in the German Federal Republic Offenlegungsschrift 23 58 365. This apparatus includes a hollow body which becomes plugged by the growing filter cake. The resulting difference in pressure between the interior of the hollow body and the space surrounding the latter is used as an indicator of the filter cake thickness.

The German Democratic Republic Pat. No. 92,700 describes a method, and a corresponding apparatus, for measuring the thicknesses of filter cakes in alluvial filters. Here, the desired filter cake thickness is selected and set. A fluid stream is branched off and the thickness of the filter cake produced therefrom is measured.

None of the above-described measuring methods and apparatus are completely satisfactory since they do not permit optimum operating conditions to be achieved. An overloading of the filter discs or plates occurs time and again due to the shortcomings of the control apparatus. As a result of such overloading of the individual discs, as well as the entire filter package, are deformed or destroyed.

The deformation often manifests itself in that the discs are pushed or bent away from one another or in that the discs are pushed or bent in a predominantly downward direction. The generally accepted explanation for such deformations is that the solids present in the fluid being filtered penetrate the space between two adjacent discs in a wedge-like manner and that the plates are bent by such penetration.

SUMMARY OF THE INVENTION

One object of the invention is to provide a disc filter and a filtering method which make it possible to reliably prevent overloading of the filter plates or discs.

Another object of the invention is to provide an arrangement and a method which enable substantially maximum loading of the filter discs or plates of a disc filter to be achieved while overloading of the filter discs or plates is avoided.

These objects, as well as others which will become apparent as the description proceeds, are achieved in accordance with the invention. According to one aspect of the invention, there is provided a disc filter which comprises a housing and a plurality of filter discs or plates mounted in the housing at different levels of the latter. Means is provided for sensing the presence of a filter cake formed on one of the filter discs when the filter cake has a predetermined thickness. The sensing means includes a sensing member which is displaceable in response to the generation of a pressure differential thereacross and which is arranged above the aforesaid one filter disc. The sensing means also includes switch means connected with the sensing member and operative in response to displacement of the sensing member.

The sensing member is advantageously in the form of a plate.

An embodiment of the invention contemplates for the filter discs to have imperforate lower sides or surfaces. The sensing member or plate is arranged between a pair of filter discs and is favorably positioned immediately below the lower surface of the upper filter disc of the pair.

According to another aspect of the invention, there is provided a method of filtering a medium or fluid in a disc filter which comprises contacting the medium or fluid with the filter discs or plates of the filter under pressure so as to cause separation of the liquid and solids of the fluid with an accompanying formation of filter cakes on the filter discs due to accumulation of the solids on the same. A signal is generated when the filter cake on one of the filter discs reaches a predetermined thickness. The signal is generated by causing a pressure differential to develop across a sensing member which is arranged above the aforesaid one filter disc and is displaceable in response to the generation of pressure differential thereacross.

The pressure differential may be generated when the filter cake partially covers the sensing member, which is advantageously in the form of a plate, and arises due to the pressure of the fluid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a sectional view of a portion of a disc filter and of an embodiment of the invention.

DESCRIPTION OF THE PREFERRED EMBODIMENTS

As mentioned previously, of particular interest to the invention are a method and arrangement for monitoring or sensing the thickness of filter cakes which build up in disc filters, especially purifying filters of the centrifugal type.

The filter discs or plates of disc filters normally have imperforate lower surfaces.

The invention is based on the surprising finding that the filter discs or plates are pushed or bent away from one another not because of the quantity of a filter cake and the pressure generated thereby but, rather, because of the pressure differential which develops between the upper and lower surfaces of a sensing plate as a result of a reduction in surface area caused by the filter cake. This reduction in surface area occurs at the imperforate lower side of a given filter disc due to the build-up of a filter cake during overloading on the filter disc arranged below the given filter disc.

According to one aspect of the invention, the objects of the invention are achieved by an arrangement for monitoring or sensing the layer thickness of a filter cake formed in a disc filter. A preferred embodiment of the arrangement is characterized in that a sensing plate is positioned immediately below the imperforate lower surface of a filter disc. The sensing plate is arranged to transmit a force arising from pressure to a contact lug or a terminal via structural components.

According to another aspect of the invention, the objects of the invention are achieved by a method of monitoring or sensing the layer thickness of a filter cake formed in a disc filter. A preferred embodiment of the method is characterized in that the pressure generated in the filter housing by the medium or fluid being filtered causes a sensing plate to be pressed against a filter cake when the latter partially covers the sensing plate and that a signal is generated thereby.

Referring now to the single FIGURE, it may be pointed out that it includes a sectional view of a portion of a disc filter and, more precisely, a rotary disc filter.

The disc filter has a wall 1 which defines a housing. Interiorly of the filter housing, there is arranged a hollow, central shaft 2 which is mounted for rotation. The shaft 2 carries a series of filter discs or plates 4 which are spaced from one another in vertical direction. The spacing between the filter discs 4 is maintained by means of spacer rings 3.

Each filter disc 4 has an upper surface on which there is provided a filter cloth 5. Each filter disc 4 further has a lower surface 6 which is imperforate and of conical configuration.

One of the filter discs has been identified by the reference numeral 4' whereas the associated filter cloth has been identified by the reference numeral 5' and the associated imperforate lower surface has been identified by the reference numeral 6'. The primes have been used so as to enable this particular filter disc and its associated elements to be readily identified as will be of advantage in the description which follows.

The FIGURE shows that filter cakes 21 have been formed on the filter cloths 5 of the filter discs 4.

Openings 22 are provided in the shaft 2 so as to provide communication between the interior of the shaft 2 and the filter discs 4.

The medium or fluid to be filtered follows a path which leads through the filter cakes 21. The solids contained in the fluid become deposited on top of the filter cloths 5. On the other hand, the filtrate flows through the filter cloths 5 and onto the imperforate lower surfaces 6 of the filter discs 4. The filtrate then flows off from the imperforate lower surfaces 6 into the hollow interior of the shaft 2 via the openings 22.

The monitoring or sensing device according to the invention may be seen to include a sensing member 9 which is here assumed to be in the form of a plate. The sensing plate 9, which is positioned below the lower surface 6' of the filter disc 4', should preferably be arranged so as to extend in parallelism with the filter discs 4.

The sensing device further includes a deformable or baffle-type member 10 which may be of tubular configuration. The deformable member 10 is mounted on a flange 8 of the sensing device. The flange 8 of the sensing device is, in turn, secured to a flange 7 provided on the wall 1 defining the filter housing. A lock nut 13 serves to secure the deformable member 10 to the flange 8 of the sensing device.

The sensing plate 9 is secured to a coupling member 11 which is provided with a clamping screw 12. The coupling member 11 and the clamping screw 12 serve as connecting means which connects the sensing plate 9 with the deformable member 10.

The sensing device also comprises a contact arrangement or switch. The switch includes a housing 15 which is secured to the flange 8 of the sensing device. Interiorly of the housing 15, there is provided a terminal or contact lug 16.

A lip or proturberance 20 extends from the deformable member 10 into the switch housing 15. An adjusting or set screw 14 is mounted on the protuberance 20. A lock unit 17 is provided for the set screw 14 and the position of the latter may be changed by manipulation of the lock nut 17.

A retaining clip 18 is mounted on the side of the flange 8 of the sensing device which is remote from the switch housing 15. The securement of the retaining clip 18 of the flange 8 is effected by means of screws 19. The retaining clip 18 serves to reinforce the sensing device.

Any downward motion of the sensing plate 9 is transmitted to the deformable member 10 via the coupling member 11 and its associated clamping screw 12. The deformable member 10 then transmits the motion to the protuberance 20 as a result of which the set screw 14 is caused to move upwardly and contact the terminal 16, that is, the downward motion of the sensing plate 9 is finally transmitted to the terminal 16 via the set screw 14. The set screw 14 may be considered as another terminal of the switch or contact arrangement.

It will be appreciated that the set point or zero point of the sensing device may be fixed as desired via the lock nut 17 provided for the set screw 14.

As outlined above, the deformable member 10 serves in transmitting a downward motion of the sensing plate 9 to the terminal 16. Aside from this, the deformable member 10 also provides a sealing function, that is, serves as a seal.

A general outline of the operation of the filter will be present here before proceeding with a detailed explanation of the principle of the sensing device according to the invention.

A medium or fluid to be filtered is admitted into the filter housing under pressure. At the beginning of the filtering operation, the same fluid pressure exists throughout the entire filter housing. Thus, the fluid pressure at the upper surface of a filter disc 4 is equal to the fluid pressure at the lower surface 6 of the filter disc 4.

As the filtering operation proceeds, the filter cakes 21 are formed on the filter cloths 5 due to the deposition of solids from the fluid being filtered. When a filter cake 21 is formed on a filter cloth 5, the fluid pressure at the upper surface of the filter cake equals the fluid pressure at the lower surface 6 of the respective filter disc 4.

Similarly, the same fluid pressure exists on the upper and lower sides of the sensing plate 9 so long as the lower surface of the sensing plate 9 is free of sediment.

As outlined earlier, the path followed by the fluid being filtered leads through the filter cakes 21. The filtrate passes through the filter cloths 5 and then flows between the latter and the imperforate lower surfaces 6 of the filter discs 4 to the openings 22. The filtrate enters the hollow interior of the shaft 2 via the openings 22 and may subsequently be withdrawn from the filter.

It follows from this that the fluid pressure at the upper surface of a filter cake is greater than that at the lower surface of this filter cake. Accordingly, a pressure differential exists across the filter cake. This pressure differential is characteristic of alluvial filters since the filter cakes provide a relatively large resistance to flow.

The concentration of suspended solids is the same throughout the filter housing at any time during the filtering period. This applies also to the area below the sensing plate 9, which latter preferably has dimensions which are relatively small as compared to the dimensions of the filter discs 4. In other words, this applies also to the filter cake 21 which is formed on the filter cloth 5 located beneath the sensing plate 9. Thus, the filter cake 21 formed beneath the sensing plate 9 builds up as quickly as the remaining filter cakes 21 including the portion thereof located directly below the sensing plate 9. This has been confirmed experimentally.

The operation of the sensing device of the invention will now be explained with reference to an Example. For ease of understanding, the description will be based on the filter disc and associated elements which are identified by primes in the FIGURE but it will be understood that the same considerations apply to the remaining filter discs 4 and their associated elements.

An operating pressure of 5 bars is generating in the filter housing. This pressure acts on the imperforate lower surface 6' of the filter disc 4' as well as on the filter cake 21 which covers the entire filter cloth 5'. If it is assumed that the area of the lower surface 6' of the filter disc 4' equals the area of the upper surface of the filter cake 21 formed on the filter cloth 5', then the same force acts on each square meter of surface.

During the filtering operation, the various filter cakes 21 are built up and, although the build-up of any filter cake 21 proceeds relatively uniformly, some nonuniformity may exist in the build-up of a given filter cake 21. At some time during the filtering operation, the filter cake 21 formed on the filter disc 4 located immediately beneath the filter disc 4' touches the imperforate lower surface 6' of the latter. As a result, a portion of the lower surface 6' is covered by this filter cake.

The forces acting on the upper surface of the filter cake 21 formed on the filter disc 4' and, hence, the forces acting on the upper surface of the filter disc 4', will now be calculated using the following exemplary dimensions:

| | |
|---|---|
| Area of the upper surface of the filter cake 21 formed on the filter disc 4' or area of the upper surface of the filter disc 4' | $A_1 = 1$ square meter $(m^2)$ = 10,000 square centimeters $(cm^2)$ |
| Area of the lower surface 6' of the filter disc 4' | $A_2 = 0.9$ square meters $(m^2)$ = 9,000 square centimeters $(cm^2)$ |
| Operating pressure | $p = 5$ bars $= 5$ kp/cm$^2$ |

When the filter is stationary, the force which acts is given by the equation: Force $= F = A \times P$. Thus,

| | |
|---|---|
| $F_1 = A_1 \times p$ | $F_2 = A_2 \times p$ |
| $F_1 = 10,000$ cm$^2 \times 5$ kp/cm$^2$ | $F_2 = 9,000$ cm$^2 \times 5$ kp/cm$^2$ |
| $F_1 = 50,000$ kp | $F_2 = 45,000$ kp |

From this it follows that a net force of 5,000 kp acts on the upper surface of the filter cake 21 4'.

The same considerations apply for the upper and lower surfaces of the sensing plate 9.

An important object of the sensing arrangement according to the invention is to enable the filtering operation to be terminated immediately prior to contact of the filter cake 21 formed on the filter disc 4 located beneath the filter disc 4' with the lower surface 6' of the latter. This is achieved in that the sensing plate 9 is subjected to the same phenomenon as described for the filter disc 4' on a reduced scale. In other words, when the height of the filter cake is such that the filter cake extends to the level of the lower surface of the sensing plate 9, the area of the lower surface is reduced and the pressure of the fluid present in the filter housing acts on the upper surface. The sensing plate 9 is pressed downwardly. Due to the lever action of the deformable member 10, the resulting linear motion is transmitted to the terminal 16 via the set screw 14. This might, for example, cause an electrical circuit to be opened or closed or, on the other hand, might cause a pneumatic circuit to be opened or closed. It will be understood that the switch having the terminal 16 and the set screw 14 may be connected with a suitable means for terminating the filtering operation upon contact between the terminal 16 and the set screw 14.

As mentioned previously, the growth or build-up of the filter cakes 21 proceeds at about the same rate at all locations within the filter housing. This includes that portion of the filter cake 21 formed beneath the sensing plate 9 which is located directly below the sensing plate 9. Thus, the filter cake 21 formed beneath the sensing plate 9 will contact the lower surface of the latter when the filter cake thickness which it is desired to achieve at all locations has been attained.

An advantage of the invention resides in that a sufficient force results on the upper surface of the sensing plate 9 of the sensing device according to the invention even with the slightest covering of the lower surface of the sensing plate 9. Due to this force, a linear motion is generated and a contact or circuit may be closed or opened.

By virtue of the invention, an overloading of the filter discs may be avoided in a simple, mechanical manner. The development of a maximum filter cake height or thickness may be achieved for any desired medium which is capable of being filtered.

The arrangement in accordance with the invention is substantially explosion-proof since a pneumatic transmittal of the information over arbitrarily large distances may be effected.

It will be understood that each of the elements described above or two or more together, may also find a useful application in other types of methods and constructions differing from the types described above.

While the invention has been illustrated and described as embodied in a disc filter having means for sensing the thickness of filter cakes and a method of filtering with the filter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A disc filter for separating solids from liquids and accumulating the solids in the form of a filter cake, comprising in combination, a housing adapted to contain an unfiltered fluid having a predetermined fluid pressure; a pipe mounted for rotation within said housing; at least two vertically spaced filter discs fixed to said pipe and each having an upper filter cake-accumulating surface, the upper of said dics also having a lower surface facing the upper surface of the lower filter disc; and sensing means for sensing a build-up of a filter cake to a desired height above the lower filter disc, said sensing means including a movably mounted plate located between said filter discs and having two generally planar sides, one of said sides facing said lower surface of the upper filter disc and the other of said sides facing and being spaced from said upper accumulating surface of the lower filter disc, so as to be approached by the growing filter cake when the same reaches the desired height, said plate being subjected to a balanced fluid pressure which acts equally on both of said sides until the growing filter cake blocks at least part of the surface area of said other side against impingement by the fluid pressure so that the fluid pressure acting on said one side then exceeds the fluid pressure acting on said other side and the plate is pressed against the filter cake under the force of the thus existing pressure differential, said sensing means also including a signalling device, and linkage means coupling said signalling device to said sensing plate for activating the former in response to pressing of the plate against the filter cake.

2. A disc filter as defined in claim 1, said housing containing an unfiltered fluid which is admitted into said housing under pressure, the unfiltered fluid having an equal fluid pressure throughout said housing at the beginning of the filtering operation, wherein said plate is immersed in the unfiltered fluid.

3. A disc filter as defined in claim 1, further comprising means connected to said housing for increasing the fluid pressure of the unfiltered fluid in said housing.

4. A disc filter for separating solids from liquids and accumulating the solids in the form of a filter cake, comprising in combination, a housing adapted to contain an unfiltered fluid having a predetermined fluid pressure; a vertical pipe mounted for rotation within said housing and defining a hollow interior; at least two vertically spaced filter discs fixed to and extending horizontally from said vertical pipe, said filter discs each comprising a perforate upper surface through which a filtrate passes and upon which a filter cake is accumulated and an imperforate lower surface forming a channel communicating with both said perforate surface and with the interior of said vertical pipe, said lower surface having dimensions and a shape adapted for the collection of said filtrate passing through said perforate upper surface and for the guidance of said collected filtrate into the interior of said vertical pipe; and sensing means for sensing a build-up of a filter cake to a desired height above the filter disc, said sensing means including a movably mounted plate located between said filter discs and having two generally planar sides, one of said sides facing said lower surface of the upper filter disc and another of said sides facing and being spaced from said upper perforate surface of the lower filter disc so as to be approached by the growing filter cake when the same reaches the desired height, said plate being subjected to a balanced fluid pressure which acts equally on both of said sides until the growing filter cake blocks at least part of the surface area of said other side against impingement by the fluid pressure so that the fluid pressure acting on said one side then exceeds the fluid pressure acting on said other side and the plate is pressed against the filter cake under the force of the thus existing pressure differential, said sensing means also including a signalling device, and linkage means coupling said signalling device to said sensing plate for activating the former in response to pressing of said plate against the filter cake.

5. A filter as defined in claim 4, said signalling device including a housing member; and wherein a flange is provided on said housing and said housing member is mounted on said flange.

6. A filter as defined in claim 4, wherein a flange is provided on said housing and said sensing means is mounted on said flange.

7. A disc filter as defined in claim 4, said signalling device including a stationary terminal, a movable terminal and a deflectable member, and wherein said movable terminal is mounted on said deflectable member which is connected with said sensing plate via said linkage means said linkage means comprising a coupling portion connected to said sensing plate and a deformable member connected to a coupling portion.

8. A disc filter as defined in claim 4, said housing containing an unfiltered fluid having a uniform concentration of suspended solids throughout said housing so as to have a uniform rate of filter cake build-up on each of said plurality of filter discs.

9. A disc filter as defined in claim 4, further comprising centrifugal means connected to said housing for increasing the fluid pressure of the unfiltered fluid through the agency of centrifugal force.

10. A disc filter as defined in claim 9, said plate being positioned above, and said sides of said plate being substantially parallel to said upper perforate surface of the lower filter disc, and said centrifugal means generating an operating pressure of 5 bar.

11. A disc filter as defined in claim 4, further comprising means for pivotally mounting said sensing plate on said linkage means.

12. A method of filtering a fluid in a disc filter, comprising the steps of positioning a sensing plate having an upper and a lower side within a disc filter housing in such a manner that said plate is intermediate two vertically spaced filter discs each having an upper surface upon which a filter cake can accumulate, the upper filter disc also having a lower surface facing the upper surface of the lower filter disc, the lower side of the sensing plate is a predetermined distance above and both sides are substantially parallel to the upper surface of the lower filter disc; adding the fluid under pressure into said filter housing so as to subject the upper and lower sides of said sensing plate to a balanced fluid pressure which acts equally on both sides of said sensing plate; accumulating filter cakes upon said upper surfaces until a filter cake extends above said upper surface of the lower filter disc to the predetermined distance and blocks at least a portion of the surface area of said lower side of said sensing plate against impingement by the fluid pressure so that the fluid pressure acting on said upper side then exceeds the fluid pressure acting on said lower side and the plate is pressed against the filter cake on said upper surface of said lower filter disc under the force of the thus existing pressure differential; sensing build-up of the filter cake accumulating on the upper surface of the lower filter disc to the predetermined distance above the upper surface of the lower filter disc by sensing pressing of said partially covered sensing plate against the filter cake; and generating a signal in response to the pressing of said sensing plate.

13. A method as defined in claim 12, wherein the pressing of said sensing plate is transferred to a movable terminal of a switch means and said movable terminal contacts a stationary terminal of said switch means in response to pressing of said sensing plate; said movable terminal comprising an adjusting screw.

14. A method as defined in claim 13, wherein said movable terminal causes opening or closing of an electrical circuit.

15. A method as defined in claim 13, wherein said movable terminal causes opening or closing of a pneumatic circuit.

* * * * *